United States Patent
Itoi

(10) Patent No.: US 7,496,050 B2
(45) Date of Patent: Feb. 24, 2009

(54) NETWORK COMMUNICATION APPARATUS

(75) Inventor: Makoto Itoi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 953 days.

(21) Appl. No.: 10/653,930

(22) Filed: Sep. 4, 2003

(65) Prior Publication Data
US 2004/0064539 A1 Apr. 1, 2004

(30) Foreign Application Priority Data
Sep. 11, 2002 (JP) ............................. 2002-265221

(51) Int. Cl.
H04L 12/28 (2006.01)
(52) U.S. Cl. .................... 370/254; 710/10; 710/104
(58) Field of Classification Search ............... 370/252, 370/285, 466, 469, 474, 490, 389, 254; 709/220–229; 340/286.02, 825.52, 825.02; 307/10; 710/8–15, 710/104, 302; 701/35, 36, 49
See application file for complete search history.

(56) References Cited

U.S. PATENT DOCUMENTS

| | | | | |
|---|---|---|---|---|
| 6,151,298 A * | 11/2000 | Bernhardsson et al. | ...... | 370/225 |
| 6,243,773 B1 * | 6/2001 | Mahalingam | ............... | 710/302 |
| 6,336,152 B1 * | 1/2002 | Richman et al. | ................ | 710/8 |
| 6,581,117 B1 * | 6/2003 | Klein et al. | ................ | 710/110 |
| 6,654,355 B1 * | 11/2003 | Marbach et al. | ............ | 370/285 |
| 6,801,942 B1 * | 10/2004 | Dietrich et al. | ............ | 709/225 |
| 6,816,466 B1 * | 11/2004 | Daniel | ......................... | 370/254 |
| 6,880,034 B2 * | 4/2005 | Manke et al. | ............... | 710/306 |
| 6,922,747 B2 * | 7/2005 | Ho | .............................. | 710/305 |
| 7,020,076 B1 * | 3/2006 | Alkalai et al. | ............... | 370/217 |
| 2003/0005086 A1 * | 1/2003 | Pouchak et al. | ............. | 709/220 |
| 2003/0154285 A1 * | 8/2003 | Berglund et al. | ............ | 709/227 |

FOREIGN PATENT DOCUMENTS

| | | |
|---|---|---|
| JP | 7-143159 A | 6/1995 |
| JP | 11-220482 A | 8/1999 |
| JP | 2000-83037 A | 3/2000 |

OTHER PUBLICATIONS

Carlos Serodio et al, "MNet-DACS: Multi-level Network Data Acquisition and Control System". IEEE, 1997, pp. 39-43.*

* cited by examiner

Primary Examiner—Aung S Moe
Assistant Examiner—Habte Mered
(74) Attorney, Agent, or Firm—Sughrue Mion, PLLC

(57) ABSTRACT

Provided is a network communication apparatus that is capable of, even when each node to be connected is undefined, managing a connection state of the node with ease. The network communication apparatus includes at least one node connected to a network and a management node that manages each of the at least one node. Each of the at least one node includes a data transmission and reception unit for transmitting and receiving data containing an ID field giving contents of the data and a data field giving an entity of the data, and an analyzing unit for analyzing meanings of the ID field and a data field of received data. The management node collects attribute information from each of the at least one node, and assigns and gives a node ID number to each of the at least one node based on the collected attribute information.

6 Claims, 11 Drawing Sheets

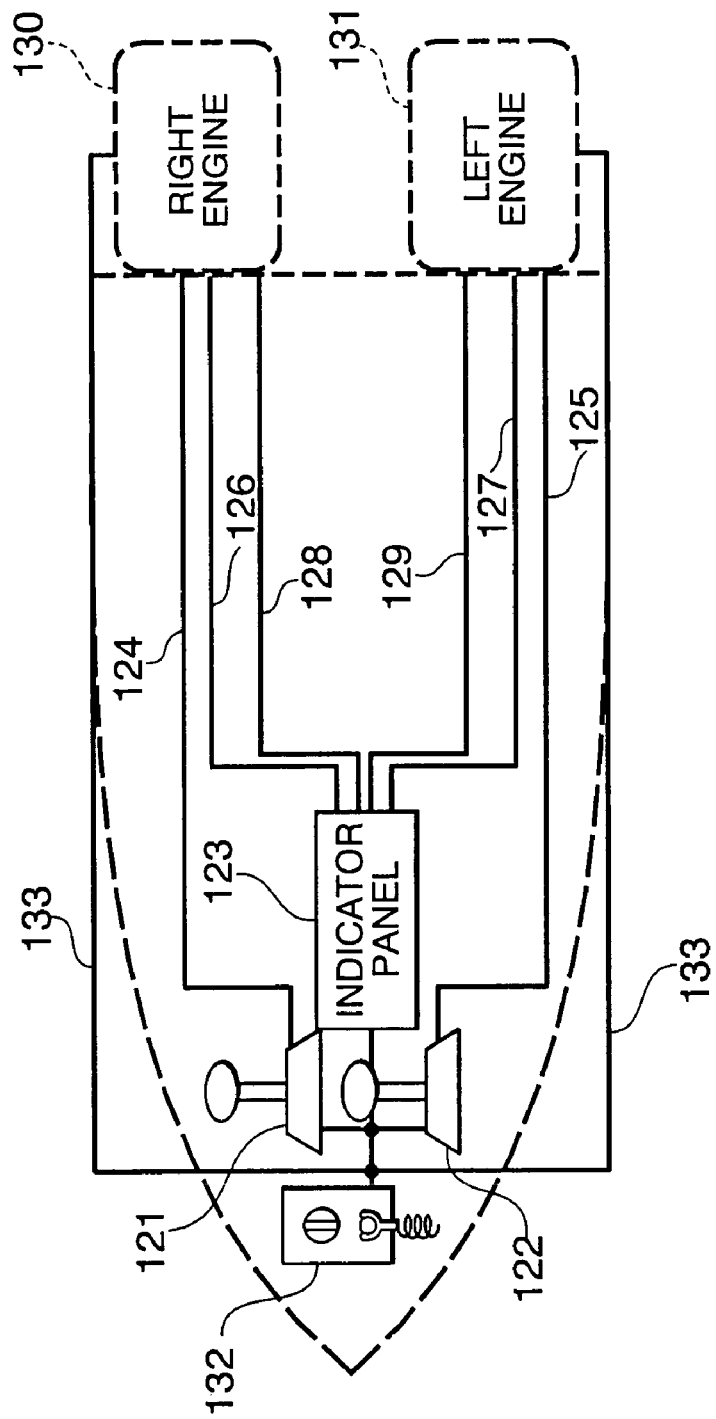

FIG.10

AN EXAMPLE OF SYSTEM CONFIGURATION DATABASE

| NAME | FUNCTION (PART NUMBER) | COMMUNI-CATABLE CHANNEL | SUPPORT MANUFAC-TURER | SUPPORTED SOFTWARE VERSION | NECESSITY |
|---|---|---|---|---|---|
| KEY SWITCH ECU | KEY SW | CAN1ch, CAN2ch | ALL | VERSION 1.0 AND UP | INDISPENSABLE |
| REMOTE CONTROLLER ECU | REMOTE CONTROLLER INFORMATION | CAN1ch | COMPANY A, COMPANY B | VERSION 2.0 AND UP | INDISPENSABLE BUT MECHANICALLY REPLACEABLE |
| THROTTLE ACTUATOR ECU | THROTTLE DRIVE | CAN1ch, RS-485 | COMPANY A, COMPANY C | VERSION 1.0 AND UP | INDISPENSABLE BUT MECHANICALLY REPLACEABLE PRESENT NODE REQUIRES A REMOTE CONTROL ECU |
| SHIFT ACTUATOR ECU | SHIFT DRIVE | CAN1ch, RS-485 | COMPANY A, COMPANY D | VERSION 1.0 AND UP | INDISPENSABLE BUT MECHANICALLY REPLACEABLE PRESENT NODE REQUIRES A REMOTE CONTROL ECU |
| STEERING ECU | STEERING INFORMATION | CAN2ch | COMPANY A, COMPANY E | VERSION 1.0 AND UP | INDISPENSABLE BUT MECHANICALLY REPLACEABLE |
| STEERING ACTUATOR ECU | STEERING DRIVE | CAN2ch, RS-485 | COMPANY A, COMPANY E | VERSION 1.0 AND UP | INDISPENSABLE BUT MECHANICALLY REPLACEABLE PRESENT NODE REQUIRES A STEERING ECU |
| RPM METER | METER | CAN1ch, CAN2ch | COMPANY A, COMPANY F | VERSION 1.0 AND UP | SELECTABLE BY OPTIONS |

※1 APPARATUS, WHOSE "NECESSITY" IS "INDISPENSABLE BUT MECHANICALLY REPLACEABLE", IS REPLACEABLE WITH CONVENTIONAL SCHEME SUCH AS PUSH-PULL WIRE.

※2 APPARATUS, WHOSE "NECESSITY" IS "PRESENT NODE REQUIRES "A"", NEEDS TO BE USED AS PAIR WITH "A" APPARATUS.

※3 WHEN APPARATUS, WHOSE "NECESSITY" IS "INDISPENSABLE", IS NOT AVAILABLE, A WARNING SHOWING THIS SITUATION IS OUTPUTTED. THE APPARATUS IS INDISPENSABLE BUT IS MECHANICALLY REPLACEABLE.

※4 APPARATUS ON NETWORK THAT DOES NOT COMPLY WITH "SUPPORT MANUFACTURER" AND "SOFTWARE VERSION" IS UNUSABLE EVEN IF THE APPARATUS CORRESPONDS TO "FUNCTION".

FIG.11

AN EXAMPLE OF A DATABASE GENERATED
WITH RECEIVED ATTRIBUTE INFORMATION

| NODE ID | FUNCTION (PART NUMBER) | MANUFACTURER NUMBER | SOFTWARE VERSION | SERIAL NUMBER |
|---|---|---|---|---|
| #1 | KEY SW | ALL | VERSION 1.0 | 43143 |
| #2 | REMOTE CONTROLLER INFORMATION | COMPANY A, COMPANY B | VERSION 2.0 | 43143 |
| #3 | THROTTLE DRIVE | COMPANY A, COMPANY C | VERSION 1.0 | 00653 |
| #4 | SHIFT DRIVE | COMPANY A, COMPANY D | VERSION 1.0 | 06536 |
| #5 | STEERING INFORMATION | COMPANY A, COMPANY E | VERSION 1.0 | 00653 |
| #6 | STEERING DRIVE | COMPANY A, COMPANY E | VERSION 1.0 | 04314 |
| #7 | METER | COMPANY A, COMPANY F | VERSION 1.0 | 00431 | ary
NETWORK COMMUNICATION APPARATUS

BACKGROUND OF THE INVENTION

1. Field of the Invention

The present invention relates to a network communication apparatus, and in particular to a network communication apparatus to be installed aboard a watercraft or the like.

2. Description of the Related Art

In the automobile field or the like, in response to a trend where devices are modularized and are rendered intelligent and the number of harnesses is reduced, device control based on serial communication including Controller Area Network (CAN) communication is being introduced rapidly.

In the automobile field, devices to be connected to and controlled through a communication line are fixed from a development stage, and the device connection will never be altered at least after shipment as a product.

FIG. 5 is a block diagram showing a conventional example of a CAN system installed aboard an automobile. In FIG. 5, reference numeral 111 denotes an accelerator position Electronic Control Unit (ECU) that is an ECU for measuring an accelerator opening degree and is given a node ID "ID#1". Reference numeral 112 represents a throttle actuator ECU that is an ECU for driving an electronically controlled throttle and is given a node ID "ID#2". Reference numeral 113 indicates an engine ECU that is an ECU for controlling an engine and is given a node ID "ID#3". Reference numeral 114 denotes a shift lever ECU that is an ECU for detecting a position of shift lever and is given a node ID "ID#5". Reference numeral 115 represents an AT ECU that is an ECU for controlling an automatic transmission and is given a node ID "ID#4". Reference numeral 108 indicates a communication line A that constitutes a network based on a CAN technique. Reference numeral 116 denotes a network A constructed by all the aforementioned construction elements.

The node IDs "ID#1" to "ID#5" set in FIG. 5 are fixed at a design stage and, once an automobile or the like provided with this network is sold, there will never be made an alteration to the device connection such as the detaching of the shift lever ECU 114.

Accordingly, it is possible to determine, at the design stage, a procedure to be executed in serial communication including communication based on the CAN system installed aboard an automobile, with the procedure being executed to identify each device (node), to specify the function thereof, and to judge whether or not the network is established as a system.

In the watercraft field, however, in contrast to the automobile field described above, an engine manufacturer only supplies an engine, for instance. Therefore, a boat builder performs assembling of a watercraft. Also, there is a case where the watercraft is provided with a plurality of engines or a plurality of maneuvering seats, for instance. Therefore, even if the same engine is used, specifications of completed watercrafts vary depending on users. As a result, it is difficult for the engine manufacturer to control the specifications of the completed watercrafts.

As described above, it is difficult for the engine manufacturer to control the specifications of the completed watercrafts. However, each apparatus possesses an independent control means and a fault warning means, which allows a network to be established as a system without any problem.

FIG. 9 schematically shows a conventional watercraft system. In FIG. 9, reference numeral 121 denotes a right remote controller; 122, a left remote controller; 123, an indicator panel; 124, a right throttle wire; 125, a left throttle wire; 126, a right engine rpm signal line; 127, a left engine rpm signal line; 128, a right engine warning signal line; 129, a left engine warning signal line; 130, a right engine; 131, a left engine; 132, a key switch (key SW); and 133, a key switch signal line for establishing connections among the key switch 132, the indicator panel 123, the right engine 130, and the left engine 131.

In FIG. 9, the right remote controller 121 is connected to the right engine 130 through the right throttle wire 124 and controls the throttle opening degree of the right engine 130 by means of wire tension. The left remote controller 122 is connected to the left engine 131 through the left throttle wire 125 and controls the throttle opening degree of the left engine 131 by means of wire tension. The indicator panel 123 is an apparatus for displaying an rpm of the engine and an engine warning state. To do so, the indicator panel 123 obtains the rpm of the right engine 130 through the right engine rpm signal line 126, obtains the rpm of the left engine 131 through the left engine rpm signal line 127, obtains a warning state of the right engine 130 through the right engine warning signal line 128, obtains a warning state of the left engine 131 through the left engine warning signal line 129, and displays these obtained information. The key switch 132 is an apparatus for starting the engines, and when a key is inserted into a key switch ECU (not shown) and is turned, the key switch signal line 133 is energized, thereby starting the indicator panel 123, the right engine 130, and the left engine 131.

In FIG. 9, one engine rpm signal line and one warning signal line are provided for each engine, so that a system is simply established in a manner such that a single engine arrangement is obtained if only one engine is connected, and a twin engine arrangement is obtained if two engines are connected.

In a network based on the CAN technique, a BUS-shaped network is constructed by H/W (hardware) in compliance with CAN specifications, and communication is performed through arbitration with reference to priorities specified by CAN-IDs.

In a conventional example, when various apparatuses are networked, control information, fault information, and the like that are independently managed by each of these apparatuses will be dealt with in a consolidated manner. In the watercraft field, assembling is performed by the boat builder as described above, so that whether all apparatuses are to be networked or only some thereof are networked and conventional apparatuses are to be used as the remaining apparatuses depends on a judgment made by the boat builder or a user. Consequently, although a specifying means each apparatus connected to the network is required, respective nodes are equally dealt with under the CAN specifications and are not given names (that is, identifiers such as node IDs).

FIG. 8 shows an example in which the same watercraft system as in FIG. 9 is constructed using a BUS-shaped network in compliance only with the CAN specifications. In FIG. 8, a right remote controller 141, a left remote controller 142, an indicator panel 143, a right engine 150, and a left engine 151 are connected to one another through a single-channel CAN-bus 144. A key switch (key SW) 152 is an apparatus for starting the engines, and when a key is inserted into a key switch ECU (not shown) and is turned, a key switch signal line 153 is energized, thereby starting the indicator panel 143, the right remote controller 141, the left remote controller 142, the right engine 150, and the left engine 151.

In the case of an automobile system or the like in which IDs are fixed in advance, such a network is established as a system. In the case of a watercraft system, however, it is not undefined whether a single engine arrangement or a twin engine arrangement is to be used, and therefore, both of these arrangement have a chance to be used by a boat builder at the time of assembling. Therefore, when the left engine 151 does not exist at the time of start, for instance, it is impossible to discriminate whether the single engine arrangement is used for the system from the beginning or wire breaking occurs in a part of the network and therefore no data reaches from the left engine 151. That is, it is impossible to discriminate whether or not the network is established as a system. It is also impossible to specify correspondences between the right and left engines and the right and left remote controllers. Further, even if an engine rpm or warning information is transmitted from the right or left engine, it is impossible to display the information on the indicator panel 143 while discriminating whether this information is a value from the right engine or the left engine.

Also, in the watercraft field, survivability is highly demanded. However, if a BUS-shaped network is used like in the aforementioned conventional example, there is a high possibility that when a fault occurs only in a part of the network, the watercraft loses its maneuvering function. As a result, a minimum return-to-port means needs to be provided.

FIG. 3 is a block diagram of a watercraft system using a BUS-shaped network in compliance only with the CAN specifications. In this drawing, reference numeral 105 denotes a remote control ECU (node D) that functions as a user interface through which a target throttle opening degree and a shift position (forward/reverse) are specified. Reference numeral 106 represents a steering ECU (node E) that functions as a user interface through which a target steering (rudder) angle is specified. Reference numeral 102 indicates a management node key switch ECU (node A) that is an ECU for detecting a key switch state. Reference numeral 103 denotes a shift and throttle actuator ECU (node B) that is an ECU for controlling a shift and throttle actuator in accordance with the target throttle opening degree and the target shift position. Reference numeral 104 represents a steering actuator ECU (node C) that is an ECU for controlling a rudder actuator in accordance with the target steering angle. Reference numeral 168 indicates hardware for a single-channel CAN copy network. Reference numeral 101 denotes a communication line A (CAN1ch), with reference symbol 101a presenting a location at which wire breaking occurs in the communication line A 101. Reference numeral 107 indicates a network B constructed by all of these construction elements.

In FIG. 3, when wire breaking occurs at the location 101a, information from the remote control ECU 105 and the steering ECU 106 does not reach the key switch ECU 102, the shift and throttle actuator ECU 103, and the steering actuator ECU 104. As a result, there occurs a situation where maneuvering of the watercraft becomes totally impossible.

In order to obtain a high fault resistance, there may be conceived a construction where the CAN-bus 101 is duplexed, for instance. In many cases, however, a CAN function is embedded in the CPU of each node, which leads to a possibility that even if the CPU possesses a bus function for a double-channel CAN network, a fault occurs in the CPU or a short-circuit fault occurs in either of the CAN buses. As a result, the CAN function on the other side may be harmed and therefore the whole of the network may fall into an error state.

The network shown in FIG. 3 is composed of a single-channel CAN network, and if a short-circuit fault or the like occurs in any of the hardware 168 for a single-channel CAN designated by the triangular marks in FIG. 3, the communication line A 101 loses all of its functions.

SUMMARY OF THE INVENTION

The present invention has been made in order to solve the problems described above and is aimed at providing a network communication apparatus that is capable of managing a node connection state with ease even when each node to be connected to a network is undefined like in the watercraft field.

With the above object(s) in view, the network communication apparatus of the present invention comprises: at least one node connected to a network; and a management node that is also connected to the network and performs management of the at least one node. Each of the at least one node comprises: a data transmission and reception means for transmitting and receiving data that contains an ID field giving contents of the data and a data field giving an entity of the data; and an analyzing means for, when the data is received, analyzing contents of the ID field and the data field of the data. The management node comprises: an attribute information collecting means for collecting attribute information on each of the at least one node; and a node ID number giving means for assigning and giving a node ID number to each of the at least one node based on the collected attribute information.

BRIEF DESCRIPTION OF THE DRAWINGS

In the accompanying drawings:

FIG. 9 is a schematic diagram showing a construction of the conventional watercraft system;

FIG. 10 an explanatory diagram showing an example of the system configuration database in the network communication apparatus of the present invention; and FIG. 11 an explanatory diagram showing an example of the database created from the received attribute information in the network communication apparatus of the present invention.

DETAILED DESCRIPTION OF THE PREFERRED EMBODIMENTS

Figure 1:
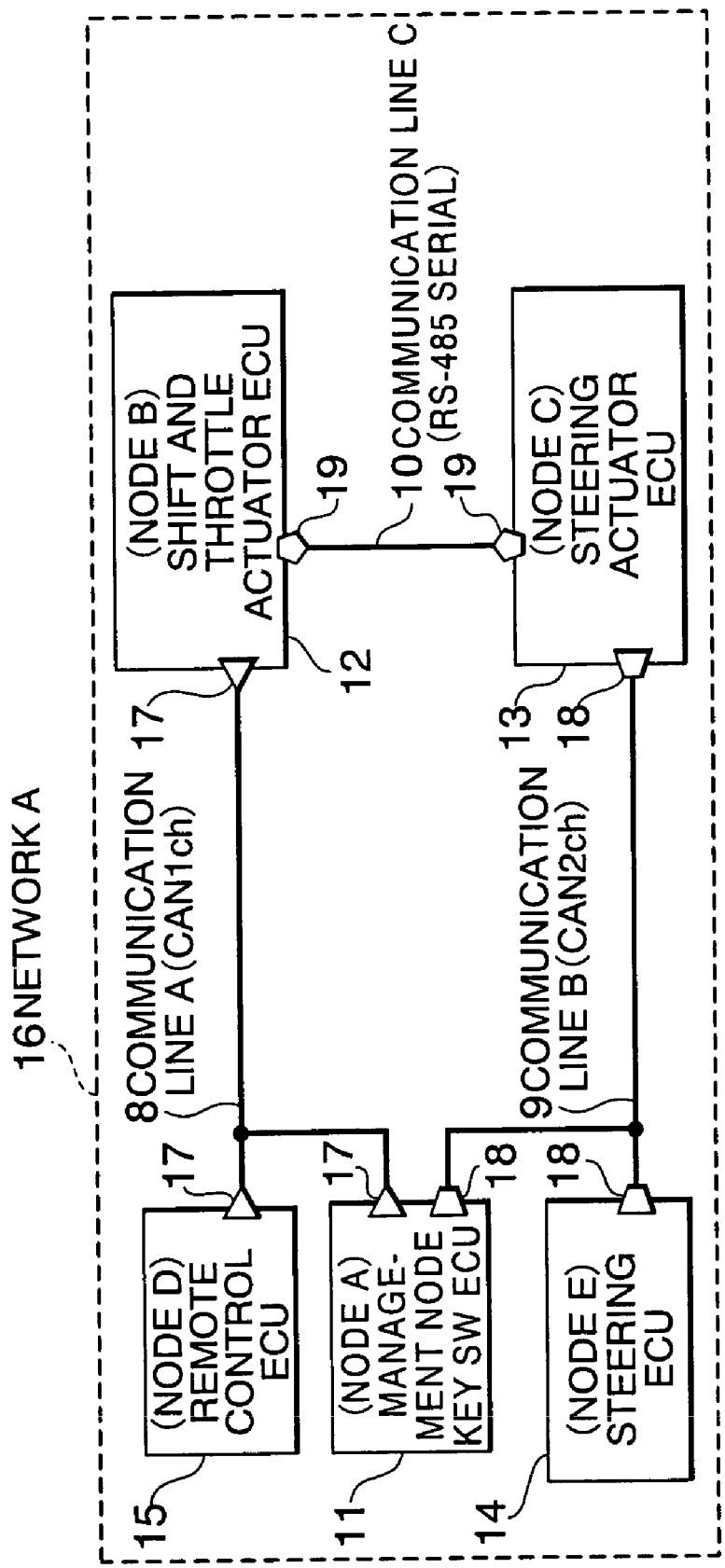
FIG. 1 is a block diagram showing a construction of a network communication apparatus of the present invention.

FIG. 1 shows the construction of a CAN communication apparatus in an embodiment of the present invention. In FIG. 1, reference numeral 8 denotes a communication line A (CAN1ch) for a first CAN channel, numeral 9 a communication line B (CAN2ch) for a second CAN channel, numeral 10 a communication line C (RS-485 serial) that is an RS-485 serial line, numeral 11 a management node key switch ECU (node A), numeral 12 a shift and throttle actuator ECU (node B), numeral 13 a steering actuator ECU (node C), numeral 15 a remote control ECU (node D), numeral 14 a steering ECU (node E), numeral 17 CAN1ch hardware for the first CAN channel (designated by triangular marks in the drawing), numeral 18 CAN2ch hardware for the second CAN channel (designated by trapezoidal marks in the drawing), numeral 19 RS-485 hardware for the RS-485 serial line (designated by pentagonal marks in the drawing), and numeral 16 a network A constructed by all of these construction elements.

Next, there will be described an operation in this embodiment. In the network A (reference numeral 16) that possesses the communication line A (reference numeral 8), the communication line B (reference numeral 9), and the communication line C (reference numeral 10), a plurality of nodes are connected to each of these communication lines and the network A (reference numeral 16) possesses the key switch ECU 11, the shift and throttle actuator ECU 12, the steering actuator ECU 13, the remote control ECU 15, and the steering ECU 14. Also, the key switch ECU 11, the shift and throttle actuator ECU 12, the steering actuator ECU 13, the remote control ECU 15, and the steering ECU 14 each include a data transmission and reception means for transmitting and receiving data containing an ID field giving contents of the data and a data field giving an entity of the data, and an analyzing means for, when the data is received, analyzing the contents (meanings) of the ID field and the data field of the received data.

Also, as shown in FIG. 1, the key switch ECU 11 is connected to the communication line A (reference numeral 8) and the communication line B (reference numeral 9), and includes a data transmission and reception means for transmitting and receiving data through the communication line A (reference numeral 8) and the communication line B (reference numeral 9). Also, the shift and throttle actuator ECU 12 is connected to the communication line A (reference numeral 8) and the communication line C (reference numeral 10), and includes a data transmission and reception means for transmitting and receiving data through the communication line A (reference numeral 8) and the communication line C (reference numeral 10). Further, the steering actuator ECU 13 is connected to the communication line B (reference numeral 9) and the communication line C (reference numeral 10), and includes a data transmission and reception means for transmitting and receiving data through the communication line B (reference numeral 9) and the communication line C (reference numeral 10). In the network A (reference numeral 16), the remote control ECU 15, the shift and throttle actuator ECU 12, and the steering actuator ECU 13 are connected in a loop shape. Also, the key switch ECU 11 is a management node. The remote control ECU 15 is one node of the communication line A (reference numeral 8), while the steering ECU 14 is one node of the communication line B (reference numeral 9).

It should be noted here that as described above, the communication line A (reference numeral 8) is constructed by the CAN1ch hardware (designated by the triangular marks in the drawing) 17, the communication line B (reference numeral 9) is constructed by the CAN2ch hardware (designated by the trapezoidal marks in the drawing) 18, and the communication line C (reference numeral 10) is constructed by the RS-485 hardware (designated by the pentagonal marks in the drawing) 19. With this construction, the physical layers of the communication line A, the communication line B, and the communication line C are realized by different hardwares. As a result, even if a short-circuit fault occurs in the CAN1ch hardware (designated by the triangular marks in the drawing) 17 for any reason and the communication line A falls into an error state, for instance, the communication line B and the communication line C are not influenced by the short-circuit fault because these communication lines B and C are constructed by hardwares which are different from the hardware of the communication line A. As a result, it is possible to allow data to reach the management node through these communication lines B and C as an alternative path.

In the management node 11, there is prestored a system configuration database that contains information on nodes that are construction elements required by the network A 16 in FIG. 1 to function as a system. An example of the system configuration database is shown in FIG. 10.

In the management node 11, there is also stored an available apparatus database showing a list of nodes each having a function of taking part in the network A 16. The construction of this available apparatus database is the same as that of the system configuration database described above and therefore is not described here.

Figure 2:
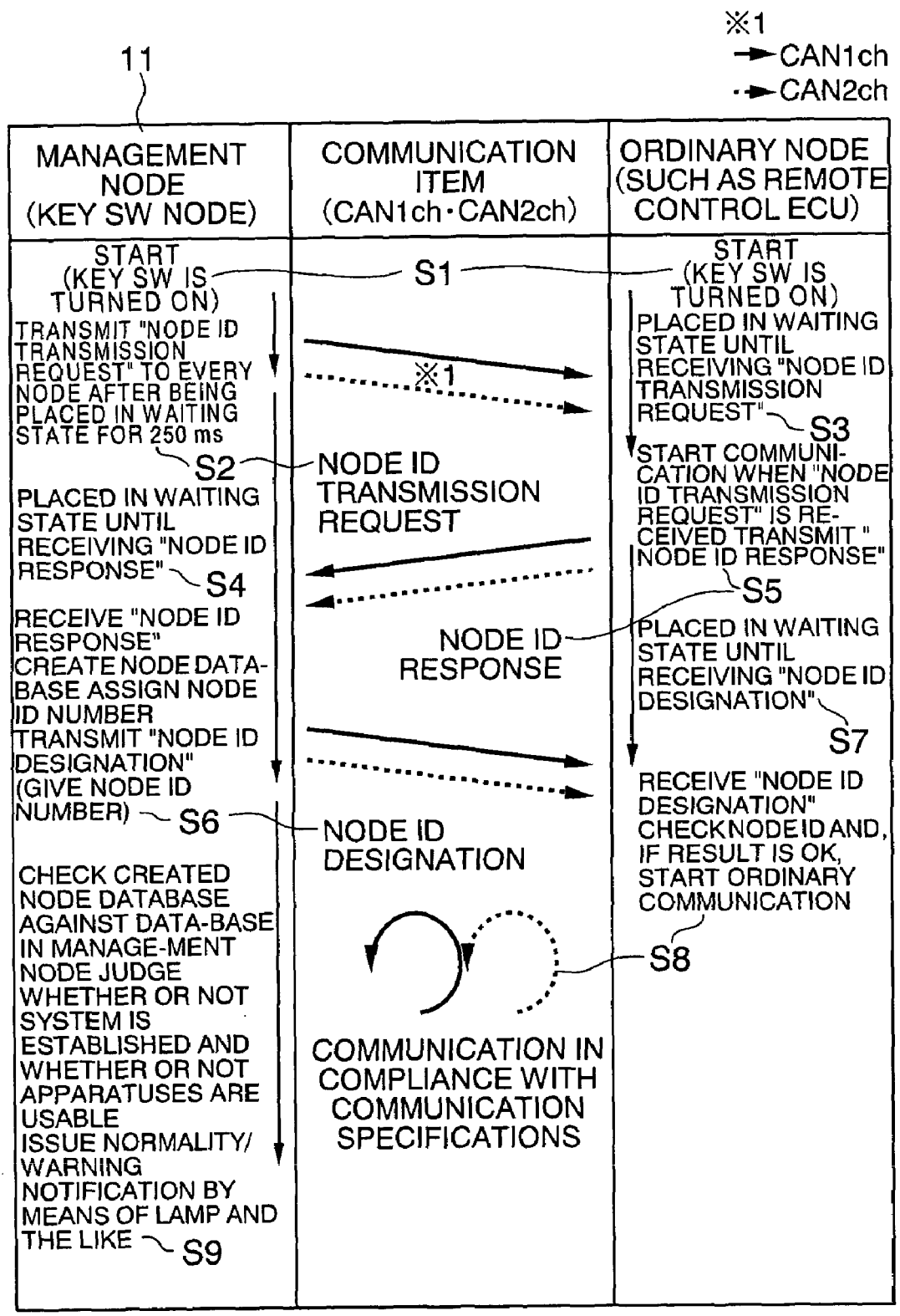
FIG. 2 is an explanatory diagram showing a flow of a process at the time of start of the network communication apparatus of the present invention shown in FIG. 1.
Figure 3:
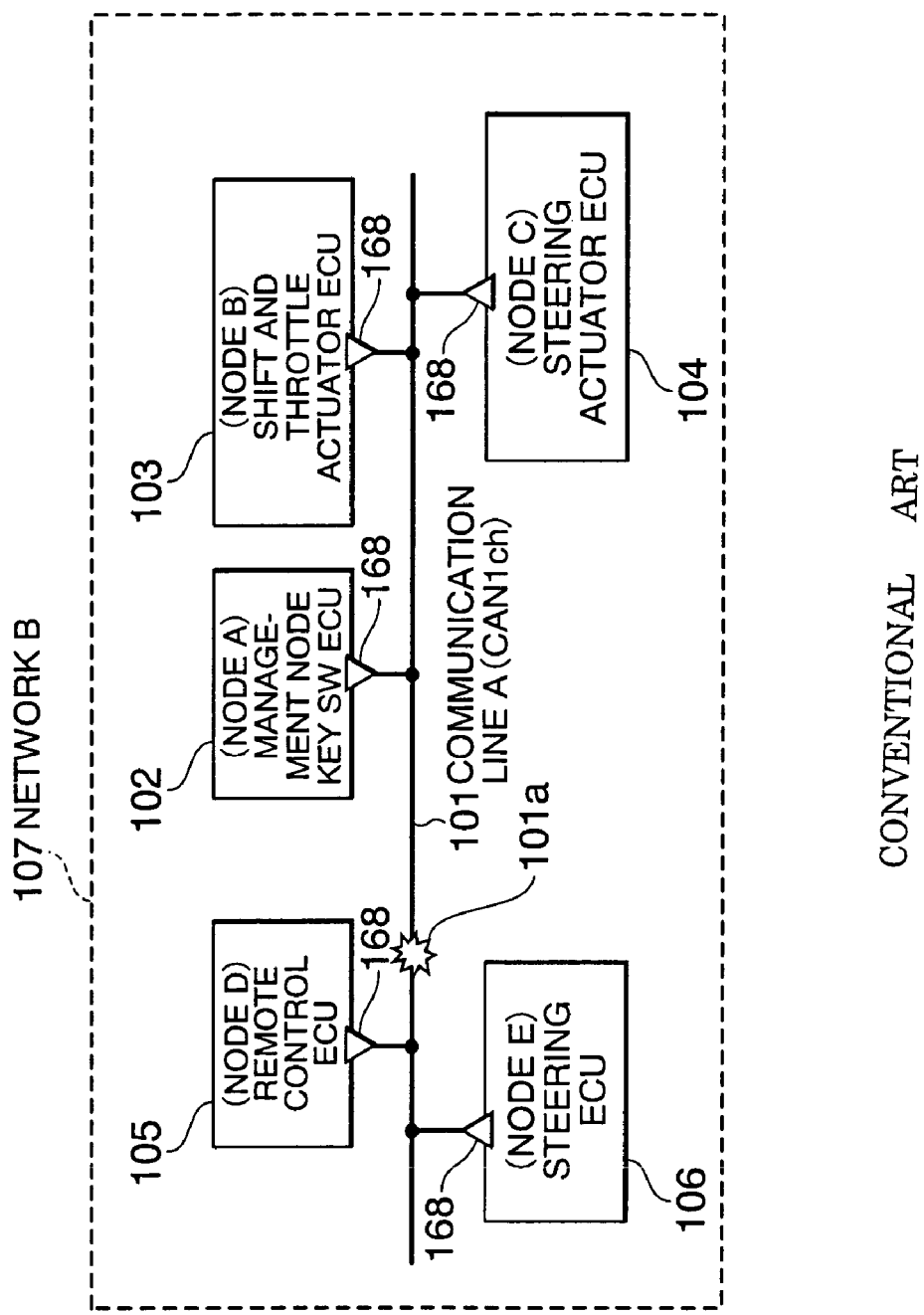
FIG. 3 is a schematic diagram showing a construction of a conventional watercraft system having a BUS-shaped network in compliance only with CAN specifications.

A procedure for starting the network is shown in FIG. 2. First, in step S1, the nodes 11 to 15 are each started. Next, after 250 ms have passed from the start of the nodes, the management node (key switch ECU) 11 transmits a "node ID transmission request" signal to each of the nodes 12 to 15 through the communication line A (reference numeral 18) and the communication line B (reference numeral 9) (step S2). Meanwhile, the remote control ECU 15, the shift and throttle actuator ECU 12, the steering actuator ECU 13, and the steering ECU 14 are each placed in a reception waiting state after the node start (step S3). On receiving the "node ID transmission request" signal, these ECUs transmit their own attribute information as a "node ID response" (step S5). Here, the attribute information refers to information that contains a manufacturer's serial number, a manufacturer's number, a part number, and the like, for instance. During this operation, the management node 11 is placed in a waiting state until receiving the "node ID response" issued in step S5 (step S4).

Next, after receiving the "node ID response" issued in step S5 from respective nodes 12 to 15, the management node 11 creates a database from the attribute in formation received in step S5, creates and assigns nodes ID based on this database, and transmits a "node ID designation" signal for giving node IDs to respective nodes 12 to 15 (step S6).

An example of the database created from the received attribute information is shown in FIG. 11

The nodes 12 to 15 are placed in a waiting state until receiving the "node ID designation" signal issued in step S6 (step S7). On receiving the "node ID designation" signal, the nodes 12 to 15 verify whether or not the given node IDs are proper as their own IDs and, if it is judged that there exists no problem, start their ordinary communication operations in step S8.

In step S9, the management node 11 checks the system configuration database in the management node 11 against the database created from the "node ID response" received in step S5, and judges whether or not the network is established as a system. Here, a notification showing whether or not the network is established as a system is issued to a user by means of, such as, a lamp. That is, when the network is not established as a system, the lamp is lit up to thereby issue a warning. As a result of this operation, it becomes possible for a user to judge whether or not a system is established merely by connecting the apparatuses.

As another process performed in step S9, the management node 11 checks the available apparatus database in the management node 11 against the database created from the "node ID response" received in step S5, and judges whether or not each node meets requirements for taking part in the network. Here, a notification showing whether or not the node is capable of taking part in the network is issued to a user by means of, such as, a lamp. As a result of this operation, it becomes possible for a user to judge whether or not a system is established merely by connecting the apparatuses.

Figure 4:
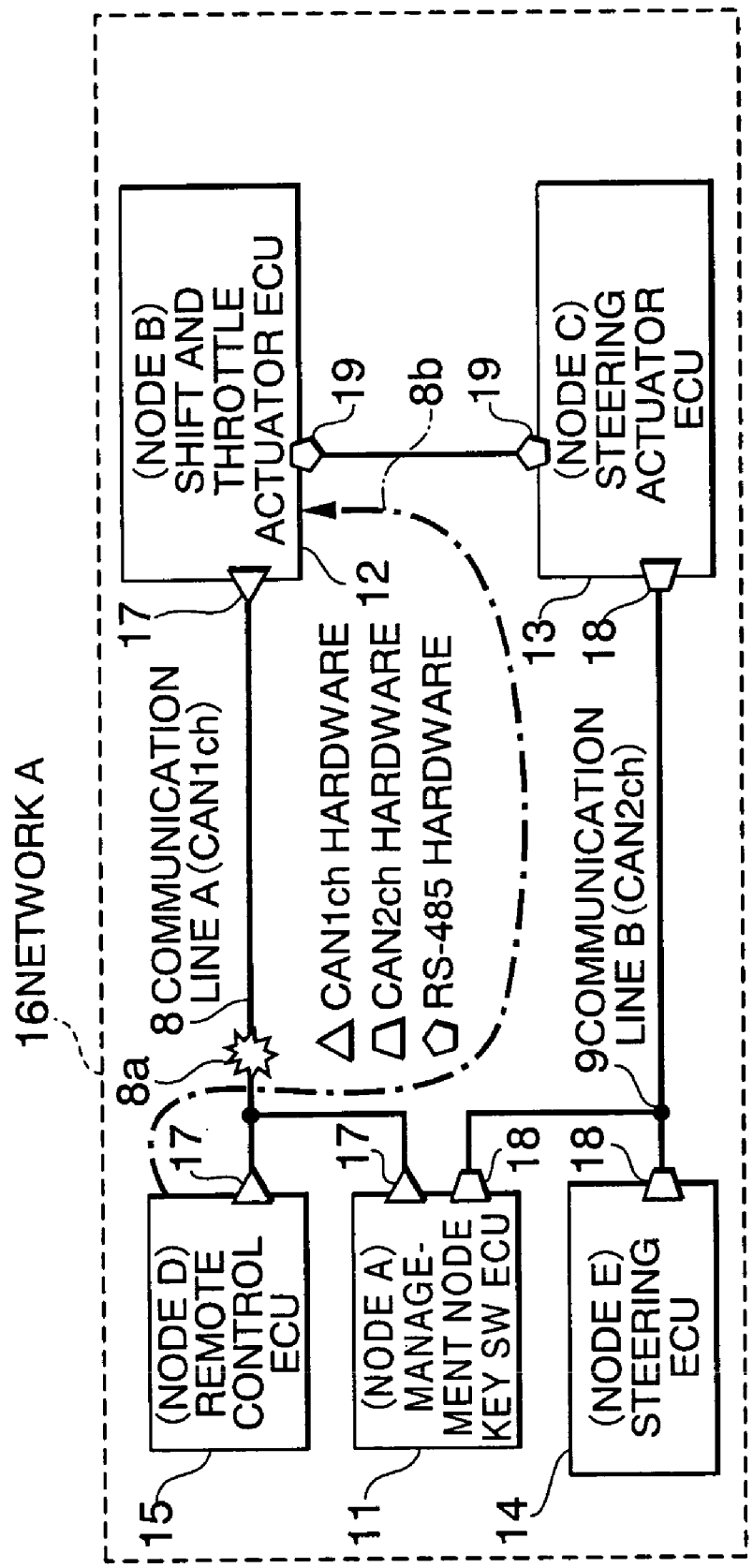
FIG. 4 is an explanatory diagram showing a case where a wire breaking occurs in a part of a network constructed by the network communication apparatus of the present invention shown in FIG. 1.
Figure 5:
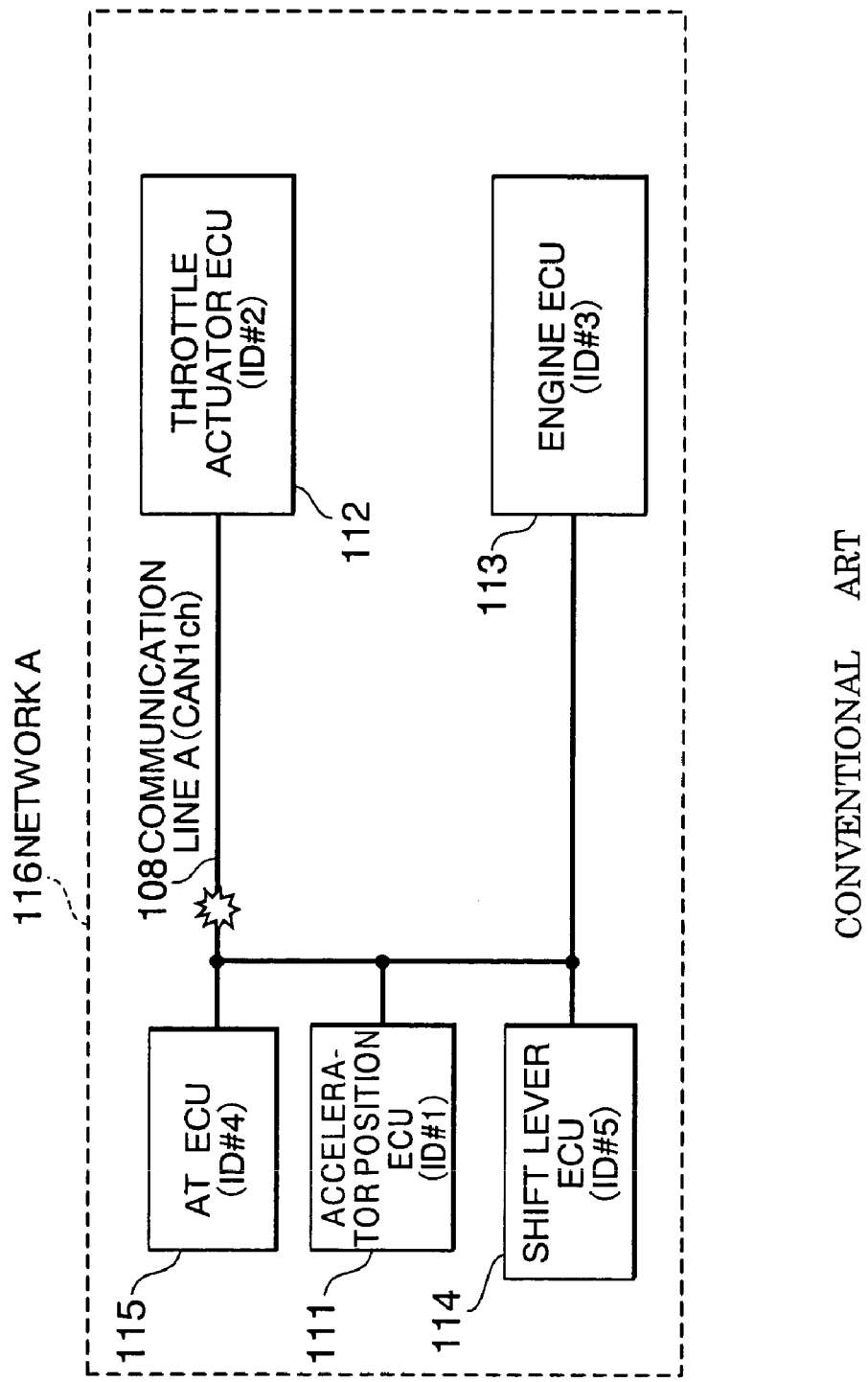
FIG. 5 is a block diagram showing an example of a conventional CAN system installed aboard an automobile.
Figure 6:
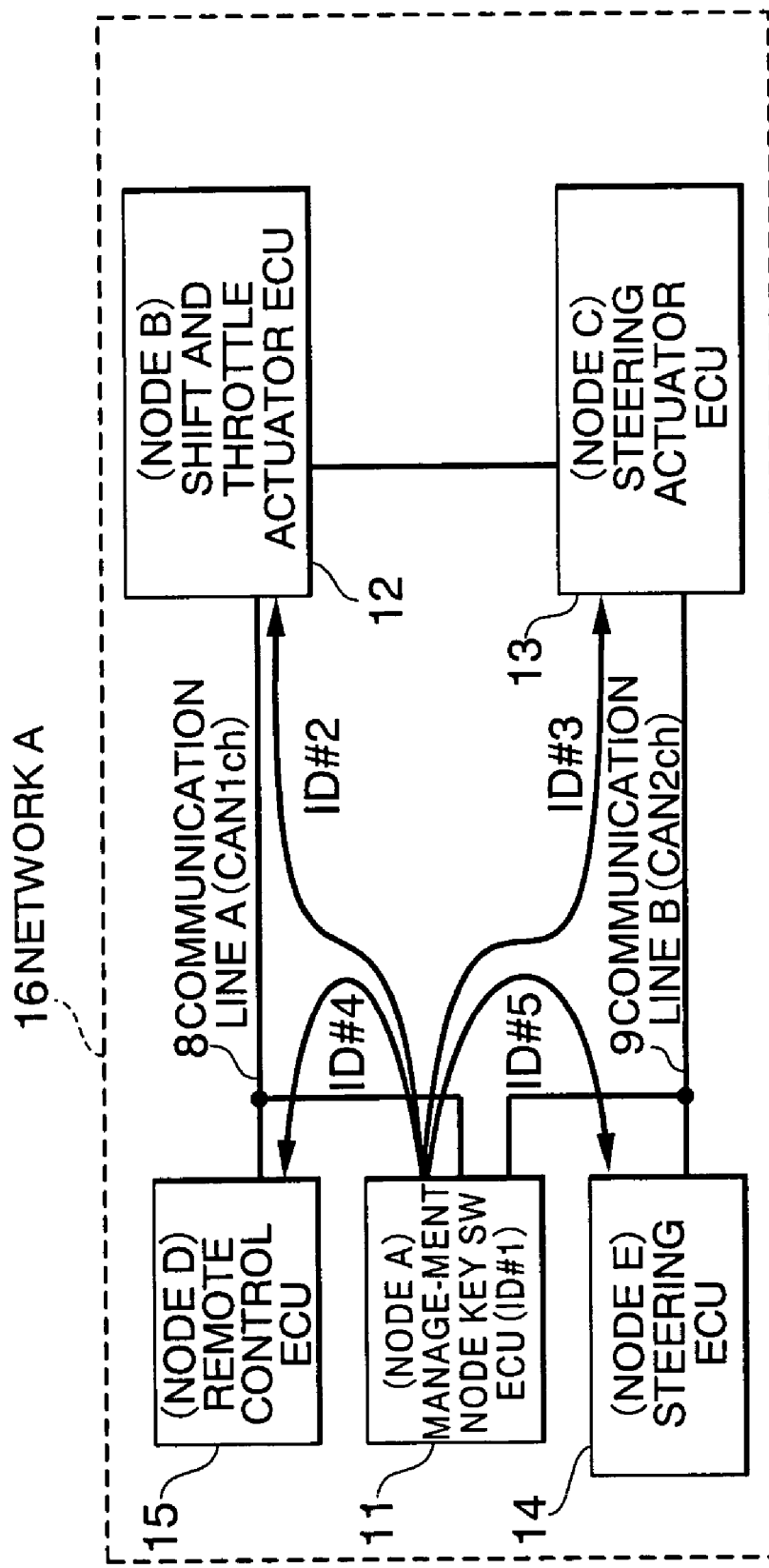
FIG. 6 is an explanatory diagram showing an operation in which a management node gives an ID to each node in the network communication apparatus of the present invention in FIG. 1.

That is, in the case of the system shown in FIG. 4 in which there are used fixed IDs, a system is established even if no management node exists. In the watercraft field or the like, however, apparatuses to be connected are undefined, so that the management node shown in FIG. 2 is provided and an ID is given to each node and the node ID is managed by this management node. With this construction, it becomes possible to guarantee that a network is established as a system.

Figure 7:
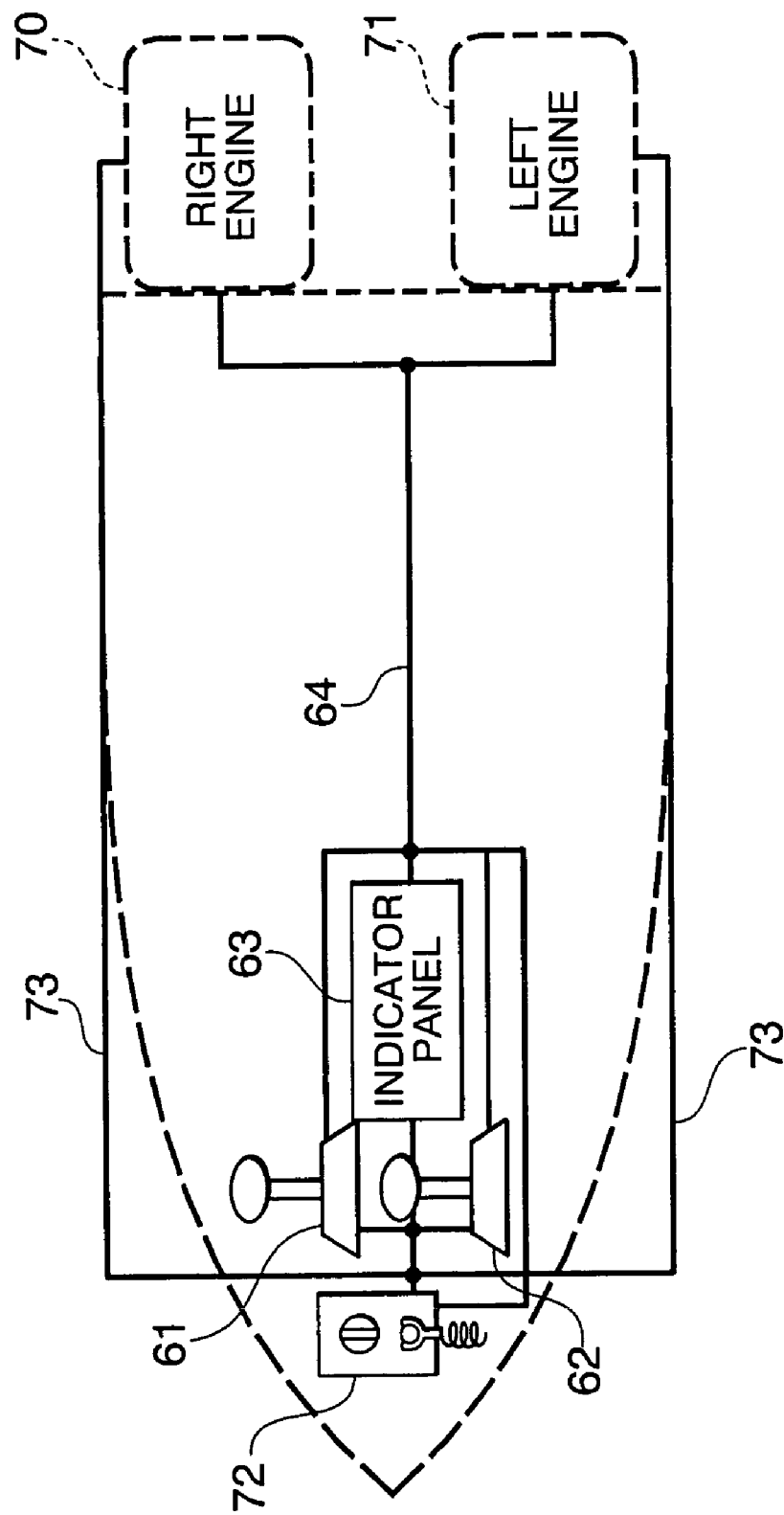
FIG. 7 is a schematic diagram showing a construction of a watercraft system that uses the network communication apparatus of the present invention shown in FIG. 1.
Figure 8:
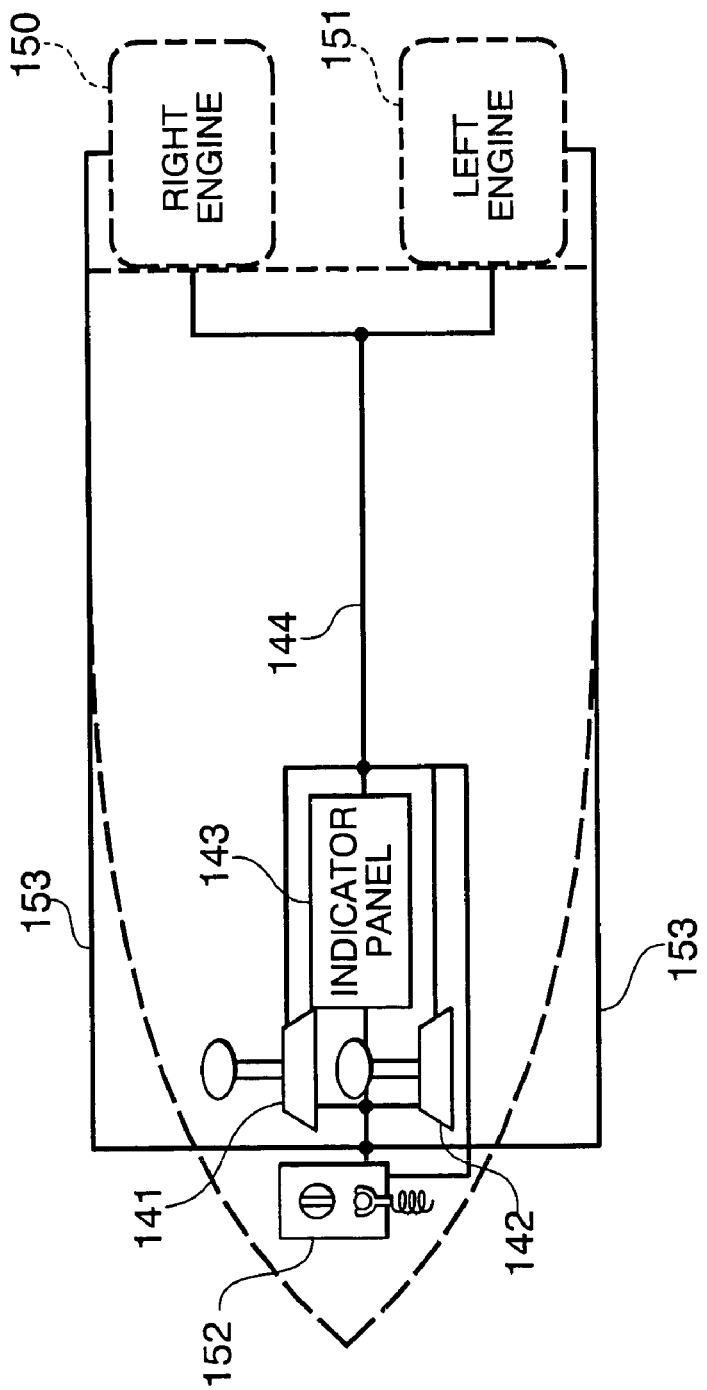
FIG. 8 is a schematic diagram showing a construction of a conventional watercraft system in compliance only with the CAN specifications.

FIG. 7 shows a system in which the aforementioned management node of the present invention is added to the system shown in FIG. 8 in which no management node is provided. The management node is set in the key switch 72 because it is possible to consider that this key switch 72 is an apparatus existing in every watercraft system.

In the system shown in FIG. 7, the presence of the management node of the present invention makes it possible to discriminate whether or not a single engine arrangement or a twin engine arrangement is used. As a result, it becomes possible to discriminate whether a single engine arrangement is used from the beginning or no data reaches due to wire breaking occurring in a part of the network. That is, it becomes possible to discriminate whether or not the network is established as a system. It also becomes possible to specify correspondences between the right and left engines and the right and left remote controllers. Further, when the rpm of engine or warning information is transmitted from the right or left engine, it becomes possible to perform displaying on the indicator panel 63 while distinguishing whether the information is data from the right or left engine.

With the construction shown in FIG. 1, in normal times, data is transmitted from the remote control ECU 15 to the key switch ECU 11 and the shift and throttle actuator ECU 12 through the communication line A (reference numeral 8). On the other hand, as shown in FIG. 4, when wire breaking occurs in the communication line A (reference numeral 8) at a wire breaking location 8a for any reason, the remote control ECU 15 detects this wire breaking with reference to a situation where periodic communication from the shift and throttle actuator ECU 12 is interrupted. In this case, the data from the remote control ECU 15 is transmitted to the shift and throttle actuator ECU 12 through a data transmission alternative path 8b indicated by the alternate long and short dash line (that is, through the remote control ECU 15, the management node 11, the communication line B (reference numeral 9), the steering actuator ECU 13, and the communication line C (reference numeral 10)). As described above, in this embodiment, each node is connected in a loop shape in advance, so that even if wire breaking occurs at a location for any reason, it is possible to transmit data using an alternative path. As a result, it becomes possible to provide a user with a high fault resistance.

Also, in FIG. 4, even if a short-circuit fault occurs in the CAN communication portion (specified by the triangular mark) 17 in the shift and throttle actuator ECU 12 for any reason and the communication line A (reference numeral 8) falls into an error state, the communication line B (reference numeral 9) and the communication line C (reference numeral 10) are implemented using different hardware (specified by the trapezoidal marks and pentagonal marks), so that communication through the communication line B (reference numeral 9) and the communication line C (reference numeral 10) is not influenced by the short-circuit fault. For instance, data transmitted from the shift and throttle actuator ECU 12 is capable of reaching the management node 11 through the communication line C (reference numeral 10), the steering actuator ECU 13, and the communication line B (reference numeral 9). As a result, it becomes possible to provide a user with a high fault resistance.

As described above, according to the present invention, a management node is provided and at least two nodes are connected in addition to the management node, thereby forming a loop-shaped network. Also, the management node includes means for collecting attribute information of the network, holds a database for establishing a network, and checks the collected attribute information against the database. With this construction, it becomes possible to facilitate a procedure for establishing network connection and to judge whether or not the network is established as a system. In addition, the network connection is established in a loop shape, so that there is secured an alternative path to be used at the event of an emergency, which makes it possible to increase the fault resistance of the network. Therefore, a management of a node connection state can be performed with ease even when each node to be connected to a network is undefined like in the watercraft field.

What is claimed is:

1. A network communication apparatus comprising:
at least one node connected to a network; and
a management node that is also connected to the network and performs management of the at least one node,
wherein each of the at least one node comprises:
a data transmission and reception means for transmitting and receiving data that contains an ID field giving contents of the data and a data field giving an entity of the data; and
an analyzing means for, when the data is received, analyzing contents of the ID field and the data field of the data, and
wherein the management node comprises:
an attribute information collecting means for collecting attribute information on each of the at least one node;
a node ID number giving means for assigning and giving a node ID number to each of the at least one node based on the collected attribute information;
a system configuration database storage means for storing a system configuration database showing each node that is required as a construction element with which the network is established as a system;
a database creating means for creating a database from the attribute information collected by the attribute information collecting means;
a system establishment judging means for judging whether or not the network is established as a system by checking the database created by the database creating means against the system configuration database;

an available apparatus database storage means for storing an available apparatus database showing each node provided with a function with which the node is connectable to the network; and an available node judging means for judging whether or not each of the at least one node is connectable to the network by checking the database created by the database creating means against the available apparatus database.

2. A network communication apparatus according to claim 1, wherein the network includes at least a first communication line, a second communication line and a third communication line, and at least a first node, a second node and a third node are connected to the network as the at least one node, wherein the first node is connected to the first communication line and the second communication line, and includes a data transmission and reception means for performing transmission and reception through the first communication line and the second communication line;

wherein the second node is connected to the first communication line and the third communication line, and includes a data transmission and reception means for performing transmission and reception through the first communication line and the third communication line;

wherein the third node is connected to the second communication line and the third communication line, and includes a data transmission and reception means for performing transmission and reception through the second communication line and the third communication line; and wherein the network is constructed by connecting the first node, the second node and the third node in a loop shape through the first communication line, the second communication line and the third communication line.

3. A network communication apparatus according to claim 2, wherein the first communication line, the second communication line, and the third communication line are constructed by different hardware.

4. A network communication apparatus comprising:

at least one node connected to a network; and a management node that is also connected to the network and performs management of the at least one node, wherein each of the at least one node comprises:

a data transmission and reception unit for transmitting and receiving data that contains an ID field giving contents of the data and a data field giving an entity of the data; and an analyzing unit which, when the data is received, analyzes contents of the ID field and the data field of the data, and wherein the management node comprises:

an attribute information collecting unit which collects attribute information on each of the at least one node;

a node ID number giving unit which assigns and gives a node ID number to each of the at least one node based on the collected attribute information;

a system configuration database storage means for storing a system configuration database showing each node that is required as a construction element with which the network is established as a system;

a database creating means for creating a database from the attribute information collected by the attribute information collecting means;

a system establishment judging means for judging whether or not the network is established as a system by checking the database created by the database creating means against the system configuration database;

an available apparatus database storage means for storing an available apparatus database showing each node provided with a function with which the node is connectable to the network; and an available node judging means for judging whether or not each of the at least one node is connectable to the network by checking the database created by the database creating means against the available apparatus database.

5. The network communication apparatus according to claim 1, wherein said network comprises a Controller Area Network (CAN).

6. A network communication apparatus according to claim 1, wherein said at least one node connected to the network comprises at least one of: a Shift and Throttle Actuator Electronic Control Unit (ECU), a Steering Actuator ECU, a Remote Control ECU, and a Steering ECU; and wherein said management node comprises a management node key switch ECU which is also connected to the network and performs management of the at least one of: the Shift and Throttle Actuator ECU, the Steering Actuator ECU, the Remote Control ECU, and the Steering ECU.

* * * * *